United States Patent
Nomura

(10) Patent No.: US 7,600,262 B2
(45) Date of Patent: *Oct. 6, 2009

(54) CONTENT DISTRIBUTION SYSTEM, CONTENT DISTRIBUTION METHOD, AND CLIENT TERMINAL

(75) Inventor: Ryosuke Nomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 756 days.

This patent is subject to a terminal disclaimer.

(21) Appl. No.: 10/416,429

(22) PCT Filed: Aug. 16, 2002

(86) PCT No.: PCT/JP02/08313

§ 371 (c)(1),
(2), (4) Date: May 9, 2003

(87) PCT Pub. No.: WO03/029988

PCT Pub. Date: Apr. 10, 2003

(65) Prior Publication Data

US 2004/0030930 A1    Feb. 12, 2004

(30) Foreign Application Priority Data

Sep. 12, 2001    (JP)  ............................ 2001-277081

(51) Int. Cl.
     *G06F 7/04*      (2006.01)

(52) U.S. Cl. ............................ 726/27; 726/26; 726/30; 713/189

(58) Field of Classification Search ........................ None
See application file for complete search history.

(56) References Cited

U.S. PATENT DOCUMENTS

| 6,510,513 | B1 * | 1/2003 | Danieli ........................ 713/156 |
| 6,912,512 | B2 * | 6/2005 | Miyazaki et al. ............... 705/51 |
| 6,915,425 | B2 * | 7/2005 | Xu et al. ...................... 713/165 |
| 7,124,302 | B2 * | 10/2006 | Ginter et al. ................. 713/189 |
| 2004/0107168 | A1 * | 6/2004 | Millner ........................ 705/59 |

FOREIGN PATENT DOCUMENTS

| JP | H08-050559 | 2/1996 |
| JP | 10-105480 | 4/1998 |
| JP | 10-124586 | 5/1998 |

(Continued)

*Primary Examiner*—Pramila Parthasarathy
(74) *Attorney, Agent, or Firm*—Finnegan, Henderson, Farabow, Garrett & Dunner, L.L.P.

(57) ABSTRACT

The user of any one portable terminal sends a content information request including a user ID to a distribution server. In response, the distribution server distributes a stream data of content that can be used on the user's terminal. If the user of a first portable terminal intends to let a second portable terminal try out a certain content, the user sends to the distribution server the trial permission information including the user's own user ID, a content ID of the content of interest, and a digital signature. The distribution server authenticates the received information before distributing a streaming data of a trial-oriented content with the content ID and user ID attached to it as search keys. This allows the content that can be used on a given user terminal to be tried out on another user terminal without the latter user having recourse to the steps of searching for the content in question.

17 Claims, 9 Drawing Sheets

FOREIGN PATENT DOCUMENTS

| | | |
|---|---|---|
| JP | 2000-236576 | 8/2000 |
| JP | 2000-270309 | 9/2000 |
| JP | 2001-78266 | 3/2001 |
| JP | 2001-101054 | 4/2001 |
| JP | 2001-155425 | 6/2001 |
| JP | 2001-223766 | 8/2001 |
| WO | WO 01/16671 | 3/2001 |

\* cited by examiner

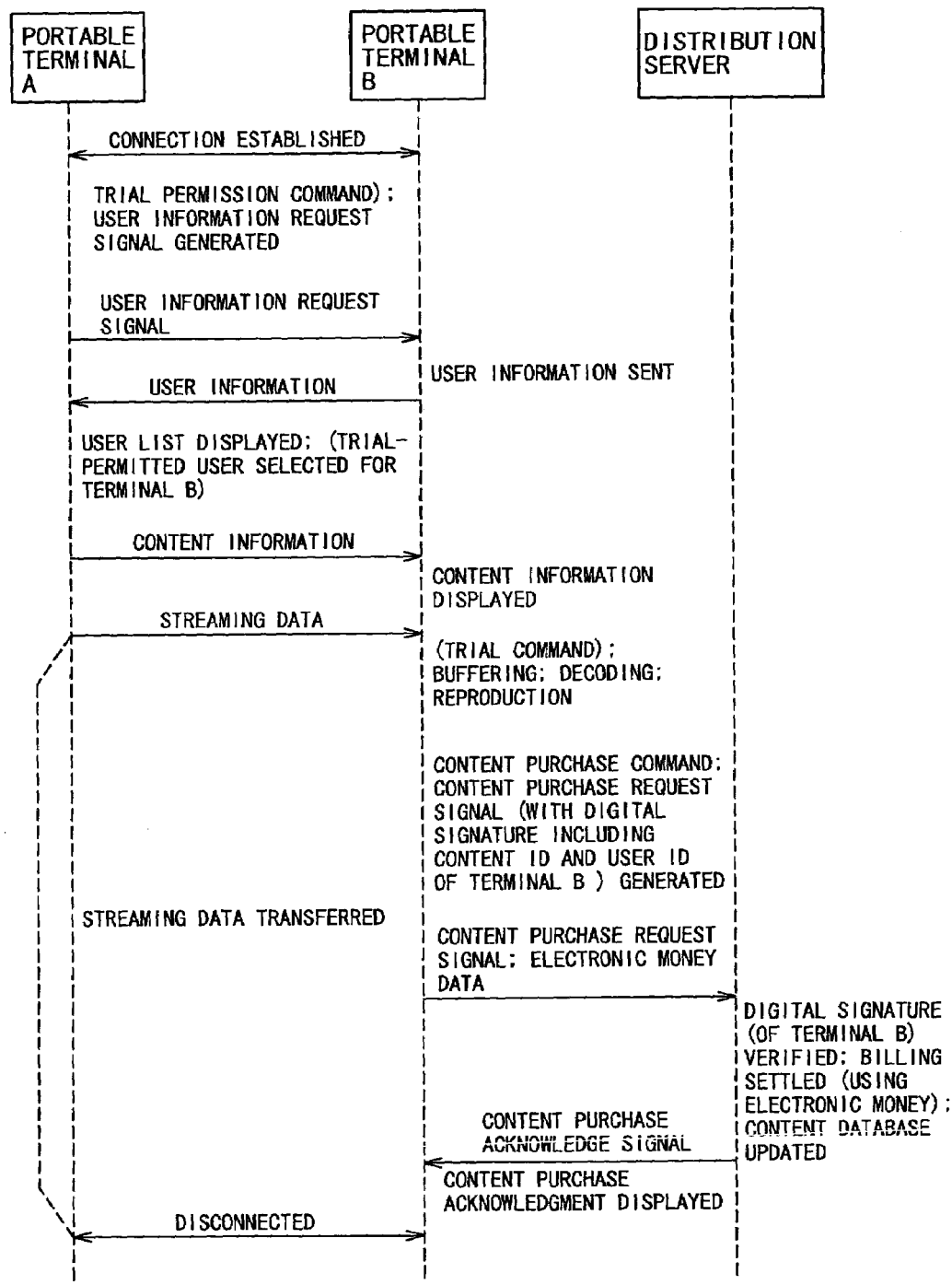

CONTENT DISTRIBUTION SYSTEM, CONTENT DISTRIBUTION METHOD, AND CLIENT TERMINAL

TECHNICAL FIELD

The present invention relates generally to a content distribution system, a content distribution method, and a client terminal whereby contents such as music and motion pictures are distributed as a stream over a network. More particularly, the present invention relates to a content distribution system, a content distribution method, and a client terminal whereby contents that can be used on a given user terminal may be recommended to a user of another client terminal.

Even more particularly, the present invention relates to a content distribution system, a content distribution method, and a client terminal whereby contents that can be used on the client terminal of a given user may be tried out on another user terminal without the latter user having recourse to the steps for searching the contents. Still more particularly, the present invention relates to a content distribution system, a content distribution method, and a client terminal whereby contents that can be used on the client terminal of a given user may be tried out on another client terminal while the copyrights of the contents in question are suitably protected.

BACKGROUND ART

Today, along with dramatic improvements in information processing and telecommunication technologies, demands for network computing techniques for interconnecting computers have been growing simultaneously. These state-of-the-art technologies allow users in remote areas to share computer resources or cooperate smoothly in such work as the sharing, distribution, delivery, and exchanges of information over networks.

There are diverse forms of networks for interconnecting computers. Examples of networks include LANs (local area networks) such as the Ethernet set up to cover limited areas; WANs (wide area networks) each interconnecting LANs using dedicated lines or the like; and the Internet that has grown so large as to interconnect computers on worldwide scale.

The Internet is a globally expanded computer network known as the Network of networks. It started out as a mass of interconnections by servers (mainly UNIX workstations) installed at universities, research institutions and other establishments. Since then more and more servers interconnected with one another, growing eventually into today's colossal network comprising countless servers each disclosing diverse resource objects to countless clients. The servers, known as hosts on the Internet, are usually interconnected as per TCP/IP (Transmission Control Protocol/Internet Protocol).

Over the Internet, numerous services are offered including WWW (World Wide Web), News, TELNET (TELetypewriter NETwork) FTP (File Transfer Protocol), and Gopher.

Of these services, the WWW works as a global information search system providing information spaces in hyperlink structures. The service is deemed the biggest factor that has driven the explosive growth and rapid popularization of the Internet worldwide. As an information search system serving on a global basis, the WWW permits browsing of diverse media including texts, images and sounds in hypertext format. So-called hypertext information handled on the WWW is described in a hypertext format description language known as HTML (Hyper Text Markup Language). At present, countless HTML documents (i.e., information resources) are disclosed on a chargeable basis or free of charge over the Internet. It is common knowledge that under TCP/IP, various information resources including the HTML documents are identified using identifiers in URL (Uniform Resource Locator) form and transferred as per HTTP (Hyper Text Transfer Protocol).

In recent years, high-speed Internet connections over telephone lines (Asymmetric Digital Subscriber Line, or ADSL) and cable TV networks have gained widespread use. The trend has raised expectations for video content distribution services involving motion pictures such as movies, animations, and live broadcasts.

Such content distribution services may be typically implemented by means of so-called streaming technology. The technology coming gradually into general use today is designed to allow audio and video data or the like to be reproduced just as they are being downloaded over the Internet, not waiting for the whole data files to be downloaded preparatory to reproduction. The streaming technology is regarded as the key to next-generation Internet usages. Well-known content distribution systems incorporating the streaming technology include "RealSystem G2" and "Windows Media Technologies."

There has been proposed a content distribution system wherein a server manages a database covering users authorized to access stored contents so that only the authorized users may receive a stream of the contents.

Another content distribution system has been proposed involves distributing encrypted content data free of charge while access right information specifying the conditions for using the encrypted contents is separately distributed by a server. That is, the system distributes contents while protecting their copyrights with suitable techniques. In response to a request from a client, a right management server distributes access right information bound for the client or its user. The access right information, to be used eventually for billing purposes, includes a user ID or a client ID together with authentication information such as a digital signature of the right management server. The client authenticates the use conditions included in the access right information and, depending on the result of the authentication, decrypts and reproduces encrypted contents using an encryption key sent to the client beforehand or along with the information.

Such content distribution systems as described above allow users to search for and purchase-desired contents from server databases through on-line accounting settling means such as electronic settlements. After completing the legitimate steps of content purchase, the users can access the contents through the client terminals.

Also proposed is a content distribution system whereby contents with their quality reduced in part or as a whole are offered to users on a trial basis subjecting to confirmation of the details of content before purchase. However one disadvantage of this system is that the users must put up with the trouble of searching for desired contents through the large quantities of contents held in databases.

For instance, in the case where one user recommends certain content to another user, another user must search anew for the content in question using an appropriate name or keyword. The content that one user may wish to recommend cannot be explained adequately to any other user unless it is actually reproduced. The elaborative steps involved for content reproduction tend to discourage users from recommending any content to other users under such a system.

There is also the problem of recognition—or the lack of it—in marketing certain contents. Some contents lead brisk business because they are advertised extensively or their authors are well known; other contents barely get the chance to be sold or even recognized because they are buried in huge quantities of themselves.

DISCLOSURE OF INVENTION

It is therefore an object of the present invention to provide a content distribution system, a content distribution method, and a client terminal whereby:

Contents available on the client terminal of a given user may be recommended to a user of another terminal; and contents that is available on a given user terminal may be tried out on another user terminal without the latter user having recourse to the steps for searching the contents; and contents that is available on a given user terminal may be tried out on another user terminal while the copyrights of the contents in question are suitably protected.

In carrying out the present invention and according to a first aspect thereof, there is provided a content distribution system for distributing contents over a network, comprising: a distribution server for giving permission to use contents; and a plurality of client terminals for reproducing distributed contents; wherein any one of the client terminals, in possession of content trial permission information for permitting the client terminal in question to use contents, offers the information to another client terminal, any one of the client terminals further receiving the content trial permission information from another client terminal so as to reproduce the contents corresponding to the received information; and wherein the distribution server permits the use of contents in response to a request for the contents from any one of the client terminals.

It should be noted here that the term "system" represents a logical assemblage of multiple devices (or functional modules for implementing specific functions). It does not matter whether the component devices or the functional modules are out together in a single chassis.

According to a second aspect of the present invention, there is provided a client terminal for reproducing contents of which the use is permitted by a distribution server; wherein the client terminal offers another client terminal content trial permission information about contents of which the use is permitted on the first client terminal, the client terminal further reproducing contents based on the content trial permission information offered by another client terminal.

According to a third aspect of the present invention, there is provided a content distribution method for distributing contents over a network consists of a distribution server for giving permission to use contents and by a plurality of client terminals for reproducing contents, the content distribution method comprising the steps of: causing the distribution server to permit the use of contents in response to a request for the contents from any one of the client terminals; allowing any one of the clients, in possession of content trial permission information for permitting the client terminal in question to use contents, to offer the information to another client terminal; and allowing any one of the client terminals, upon receipt of the content trial permission information from another client terminal, to reproduce the contents corresponding to the received information.

The distribution server manages the contents whose individual client terminals. In response to a content information request including a user ID from a client terminal, the distribution server returns a content information list specifying the contents of which the use is permitted for the user ID in question.

When a particular content is selected from the content information list on the client terminal, the distribution server distributes a stream of the selected content to that client terminal.

Any one client terminal may send to another client terminal content trial permission information including the sending terminal's user ID and the ID of the content whose use is desired to be permitted on a trial basis. The client terminal upon receipt of the trial permission information, sends a content request including the trial permission information to the distribution server.

In response to the content request including the trial permission information, the distribution server returns a content information list specifying the contents whose usage is permitted in regard to the user ID contained in the received information. When a content trial command including the trial permission information is issued by the client terminal, the distribution server responds to it by distributing a stream of the content of which the trial is permitted by the authorized user. Thus any user can try out the content recommended by another user by following simple steps.

As outlined, the inventive scheme allows contents that may be used by a given client terminal to be readily tried out by another client terminal upon recommendation.

The distribution server responds to the request from any client terminal only after completing an authentication process based on digital signatures. Content trial permission information is sent from one client terminal to another following personal authentication steps on the basis of personal authentication information held by each client terminal. These measures are designed to allow the contents usable on one client terminal to be tried out on another client terminal while the copyrights of the contents in question are being protected.

Each client terminal may preferably include: a portable authentication medium that retains personal authentication information about the terminal for facilitating the procedure of personal authentication; a personal authentication information sending method for sending the personal authentication information on the portable authentication medium; a personal authentication information receiving method for receiving personal authentication information from a second client terminal; and a personal authentication method for identifying a user of the second client terminal based on the received personal authentication information.

The distribution server may preferably allow the client terminal in possession of the content trial permission information to purchase the content corresponding to the information. The content being tried out upon recommendation from another user can thus be purchased simply by use of the received content trial permission information; there is no need to go through the elaborative steps of searching for and buying the content in question. This inventive scheme offers content providers more opportunities to deliver or distribute their contents in addition to marketing content-carrying media and offering content distribution services at websites. The contents can thus be marketed efficiently by word of mouth among friends and acquaintances.

An electronic settlement server may be established on the network to handle billing regarding the client terminals that have received contents from the distribution server. The setup facilitates the processing of content trial permissions exchanged between client terminals followed by purchases of recommended contents. The electronic settlement server may preferably utilize electronic money in dealing with billing of each client terminal. Alternatively, the electronic settlement server may have respective numbers of credit card, cash card, and/or debit card registered as part of user information relate to the client terminals involved, the information being shared with financial institutions in handling credit or debit card settlements.

Other objects, features and advantages of the present invention will become more apparent in the following specification and accompanying drawings.

BRIEF DESCRIPTION OF DRAWINGS

FIG. 9 is another schematic flow diagram depicting how the portable terminals of FIG. 4 work, the diagram showing more detailed steps performed by the user of the portable terminal A to permit the user of the portable terminal B to try out a given content usable on the terminal A, as well as steps carried out by the user of the portable terminal B to request the trial of the content from the distribution server 60 upon receipt of trial permission information from the portable terminal A, before the content thus tried out is purchased by the user of the terminal B from the server.

BEST MODE FOR CARRYING OUT THE PRESENT INVENTION

Figure 1:
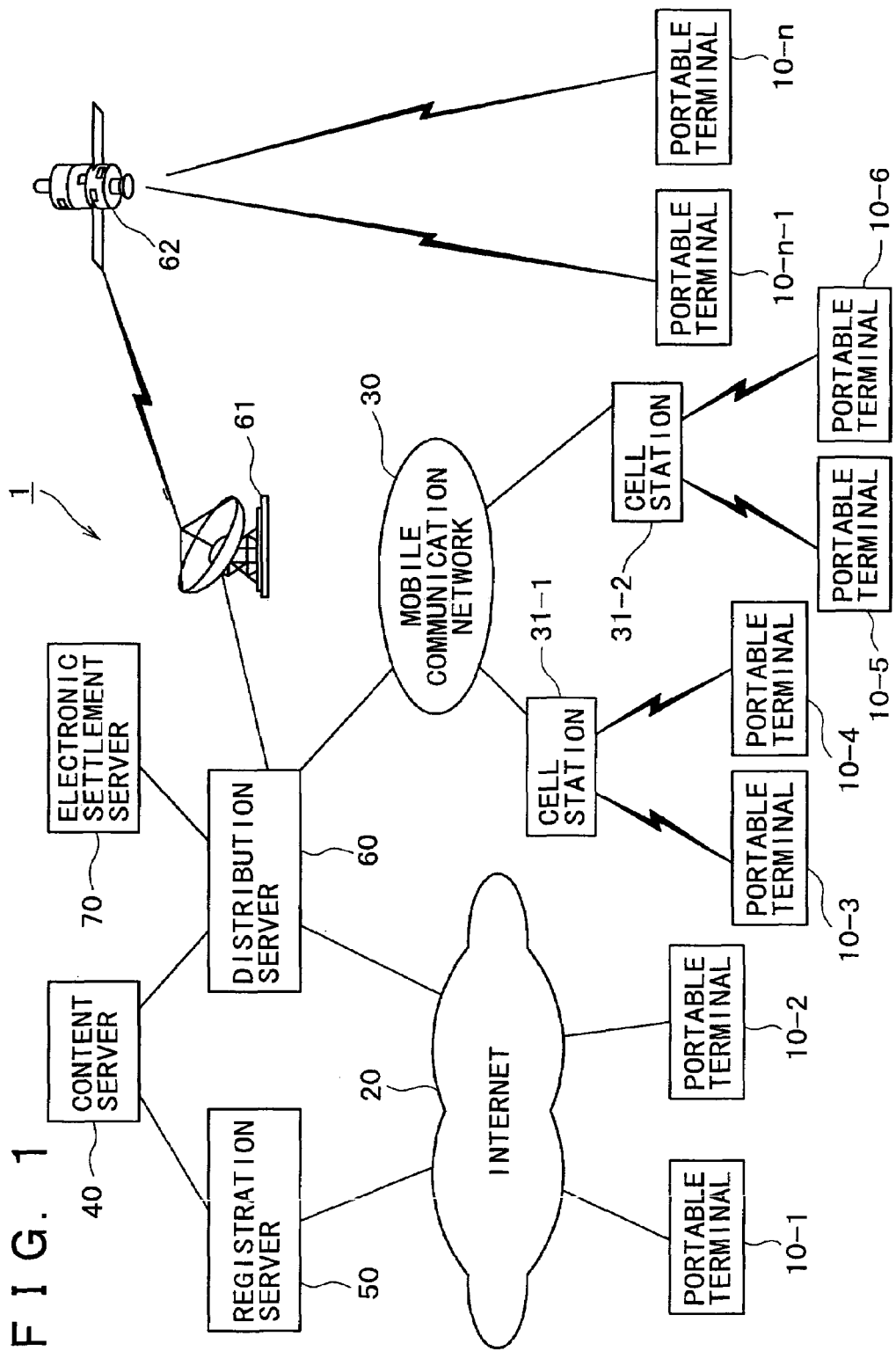
FIG. 1 is a schematic view showing a network structure of a streaming distribution system 1 embodying the present invention.

FIG. 1 schematically shows a network structure of a streaming distribution system 1 embodying the present invention. As shown in FIG. 1, there exist over the network countless portable terminals 10-1, 10-2, . . . , 10-n each owned by a user. The portable terminal 10 is illustratively a notebook computer, a PDA (personal digital assistant), or a portable telephone.

The network consists of a wide area network such as the Internet 20, a mobile communication network 30 connected with the Internet 20, and a public telephone network such as PSTN (Public Switched Telephone Network; not shown) or ISDN (Integrated Services Digital Network; not shown).

As is well known, countless servers including content servers 40 that offer contents are set up on the Internet 20. These servers offer content distribution and other services to the portable terminals 10-1, etc., connected to the network.

The portable terminals 10-1, 10-2, etc., are connected to the Internet 20 under IP (Internet Protocol) illustratively through Internet service providers (known as ISPs; not shown). The portable terminals 10-3, 10-4, etc., are networked by nearby cell stations 31-1, 3-2, etc., established by the mobile communication network 30.

In addition to the content server 40 storing and offering contents, the Internet has registration server 50, distribution server 60, and electronic settlement server 70 established thereon. The registration server 50 registers and manages the contents offered over the network. The distribution server 60 provides a content distribution service over the Internet 20 or via the mobile communication network 30. The electronic settlement server 70 bills users for the contents (i.e., service fees) offered illustratively by a streaming distribution service.

The distribution server 60 is connected to the content server 40 and electronic settlement server 70.

The content server 40 has a content database (not shown) that includes streaming data as contents, content information (including content IDs, their names, fees and explanations), and authorized user IDs.

The electronic settlement server 70 is furnished with an accounting settlement database (not shown) that stores transactions of electronic settlements regarding content purchases. Illustratively, the electronic settlement server 70 may handle billings of each client terminal by means of electronic money. Alternatively, the electronic settlement server 70 may have respective numbers of credit card, cash card, and/or debit card registered as part of user information about the users of individual client terminals. The settlement server 70 may then cooperate with other financial institutions (not shown) in dealing with credit or debit card settlements.

The distribution server 60 receives a streaming data request signal including both content and a user IDs from any of the portable terminals 10-1, etc. Upon receipt of the signal, the distribution server 60 searches the content server 40 for the requested content and verifies that the user in question is authorized to use the content, before sending the applicable streaming data to the requesting portable terminal.

The distribution server 60 also receives a content information request signal including content search conditions from any of the portable terminals 10-1, etc. On receiving the signal, the distributions server 60 retrieves content information about the content corresponding to the content search conditions from the content server 40, and sends the retrieved information to the requesting portable terminal.

The distribution server 60 also receives a content purchase request signal including both content and a user IDs from any of the portable terminals 10-1, etc. Upon receipt of the signal, the distribution server 60 adds the user ID included in the purchase request signal to a table that stores specifics of the users authorized to use the content in question, and subsequently, electronic settlement server 70 starts proceeding.

In the example of FIG. 1, the distribution server 60 is also connected to a satellite station 61. This setup allows the distribution server 60 to distribute contents to portable terminals 10-n-1 and 10-n using satellite radio waves through a communication satellite 62. In this case, the electronic settlement server 70 charges the users of portable terminals 10 for content fees as same as that in the network-based content distribution setup. Extra fees may be charged users of the communication satellite 62.

The registration server 50 is connected with the content server 40. Over the Internet 20, the registration server 50 is further connected with content upload clients, i.e., portable terminals 10 that upload contents to the content server 40.

The portable terminals 10-1, etc., (i.e., content upload clients) each stores content files created by the client user. A content file includes audio data, motion picture data, and content information. Each content upload client is connected to the registration server 50 via a network such as the Internet 20. When a content file is uploaded from a content upload client to the registration server 50, the registration server 50 verifies that the format of the content file complies with the content server 40, before encoding the audio data and motion picture data in the received content file for streaming distribution. The registration server 50 then stores the encoded streaming data and content information into the content database of the content server 40 connected with the registration server 50.

FIRST EMBODIMENT

Figure 2:
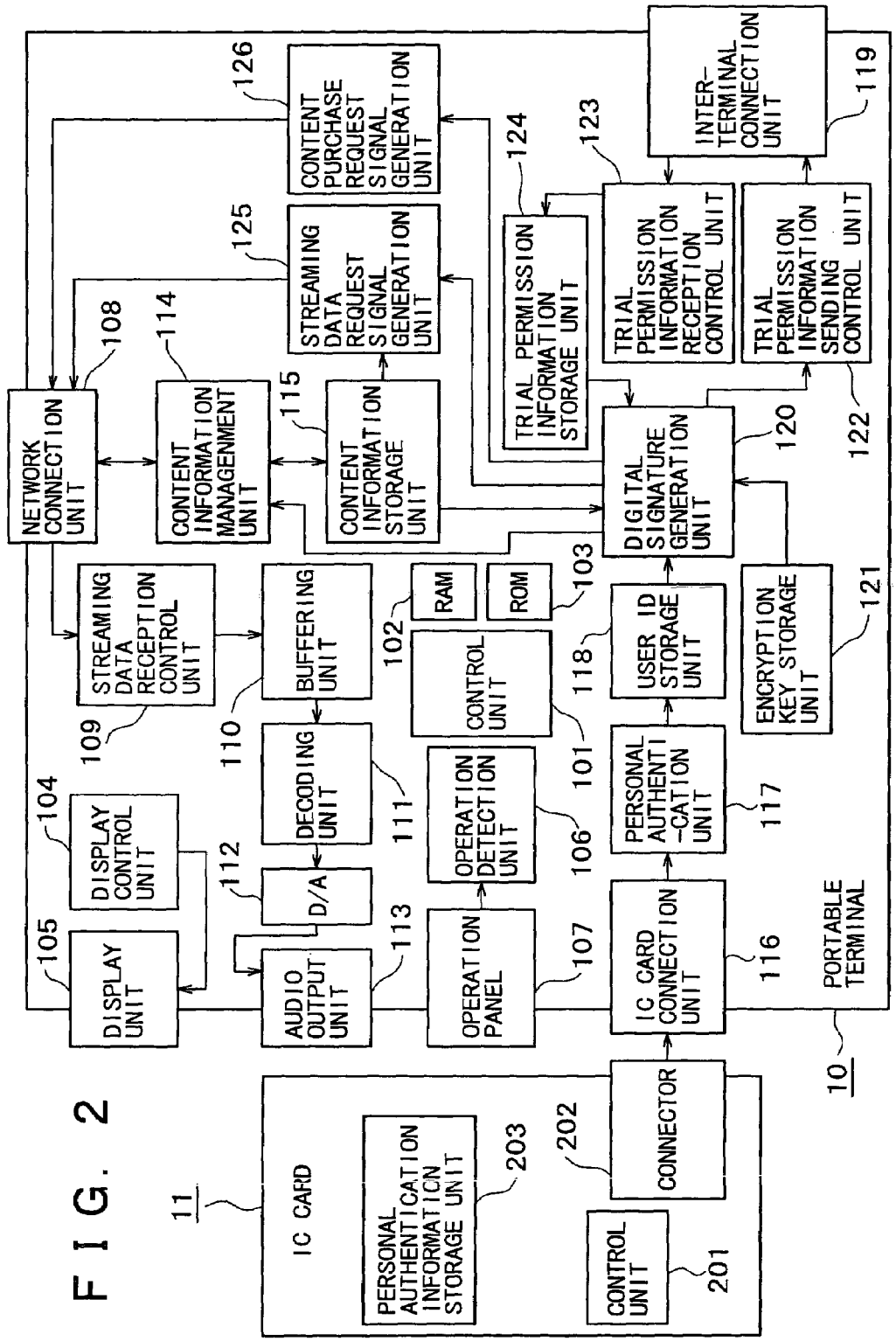
FIG. 2 is a block diagram depicting a typical structure of a portable terminal 10 acting as a content receiving client of the streaming distribution system 1 according to the present invention.

FIG. 2 depicts a typical structure of the portable terminal 10 acting as a content receiving client of the streaming distribution system 1 embodying the present invention. The portable terminal 10 in FIG. 2 is including a body of a portable terminal 10 that acts primarily to receive contents, and an IC card 11 for retaining authentication information.

The entire performance of the portable terminal 10 is controlled by a control unit 101. The control unit 101 includes a RAM (random access memory) 102 and a ROM (read only memory) 103. The RAM 102 may serve as an area in which to retain loaded programs and work data. The RAM 103 permanently stores program codes and other data. The control unit 101 is connected to various functional units shown in the figure, in order to control these units.

A display control unit 104 is connected to a display unit 105, controlling driving of displays on the display unit 105.

An operation detection unit 106 is connected to an operation panel 107. As such, the detection unit 106 detects input operations performed by the user on the operation panel 107. The display unit 105 and operation panel 107 configure the user interface of the portable terminal 10.

A network connection unit 108 is connected to an external network such as the Internet 20 as per suitable communication protocols. The network connection unit 108 permits communication with the distribution server 60 over the network.

A streaming data reception unit 109 receives streaming data from the distribution server 60 through the network connection unit 108. A buffering unit 110 temporarily buffers the streaming data being received. A decoding unit 111 decodes the encoded streaming data. The decoded data are converted to an analog signal in the D/A conversion unit 112 for audio output from an audio output unit 113 such as a speaker.

A content information management unit 114 generates a content information request signal and sends the generated signal to the distribution server 60 through the network connection unit 108. The management unit 114 receives content information via the network connection unit 108 and stores the received information into a content information storage unit 115. The unit 115 holds at least one record having fields including a content ID, a content name, explanation of the content, and a flag indicating whether the content has been purchased or is intended for trial.

An IC card connection unit 116 is designed to be connected with a connector 202 of the IC card 11. The IC card 11 includes a control unit 201 for controlling operations within the card, and a personal authentication information storage unit 203 that store personal authentication information including the owner's user ID. The personal authentication information held in the personal authentication information storage unit 203 is sent to a personal authentication unit 117 on the portable terminal 10 through the connector 202 and IC card connection unit 116. When the user is authenticated by the personal authentication unit 117, the user ID of that user is placed into a user ID storage unit 118.

An inter-terminal connection unit 119 may be connected to another portable terminal 10 (not shown) by wired or wireless communication means for data communication with the connected terminal. Illustratively, the inter-terminal communication unit 119 establishes a terminal-to-terminal connection using such short-distance wireless communication means as IEEE802.11, Bluetooth, or infrared communication (IrDA) arrangements.

A digital signature generation unit 120 generates a digital signature to be attached to data, through the use of an encryption key stored in an encryption key storage unit 121.

A trial permission information sending control unit 122 sends trial permission information to another portable terminal through the inter-terminal communication unit 119. The trial permission information includes a content ID (held in the content information storage unit) of the content whose usage is permitted for another specific user, and the user ID stored in the user ID storage unit 118. A digital signature generated by the digital signature generation unit 120 is attached to the trial permission information.

A trial permission information reception control unit 123 receives trial permission information sent from another portable terminal 10 through the inter-terminal communication unit 119.

A streaming data request signal generation unit 125 generates a streaming data request signal for requesting a certain content desired to be reproduced on this portable terminal 10. The generated signal is sent to the distribution server 60 through the network connection unit 108. The streaming data request signal is furnished with a digital signature generated in the digital signature generation unit 120, and the signature including either a content ID held in the content information storage unit 115, or the trial permission information and user ID received from another terminal.

A content purchase request signal generation unit 126 generates a request for the purchase of content for trial and sends the generated request in signal form to the distribution server 60 through the network connection unit 108. The content purchase request signal includes the user ID and the trial permission information received from another portable terminal.

The function of portable terminal 10 shown in FIG. 2 will now be described. Personal authentication by use of the IC card 11 is carried out as follows: the user inserts the IC card 11 into a card slot (not shown) of the portable terminal 10. When the IC card connection unit 116 detects a connection (of either contact or non-contact nature) between the portable terminal 10 and the IC card 11, the personal authentication information held in the personal authentication information storage unit 203 of the IC card 11 is sent to the personal authentication unit 117 of the portable terminal 10 through the connector 202 and IC card connection unit 116. After authenticating the personal authentication information, the personal authentication unit 117 stores into the user ID storage unit 118 the user ID contained in the personal authentication information.

Figure 5:
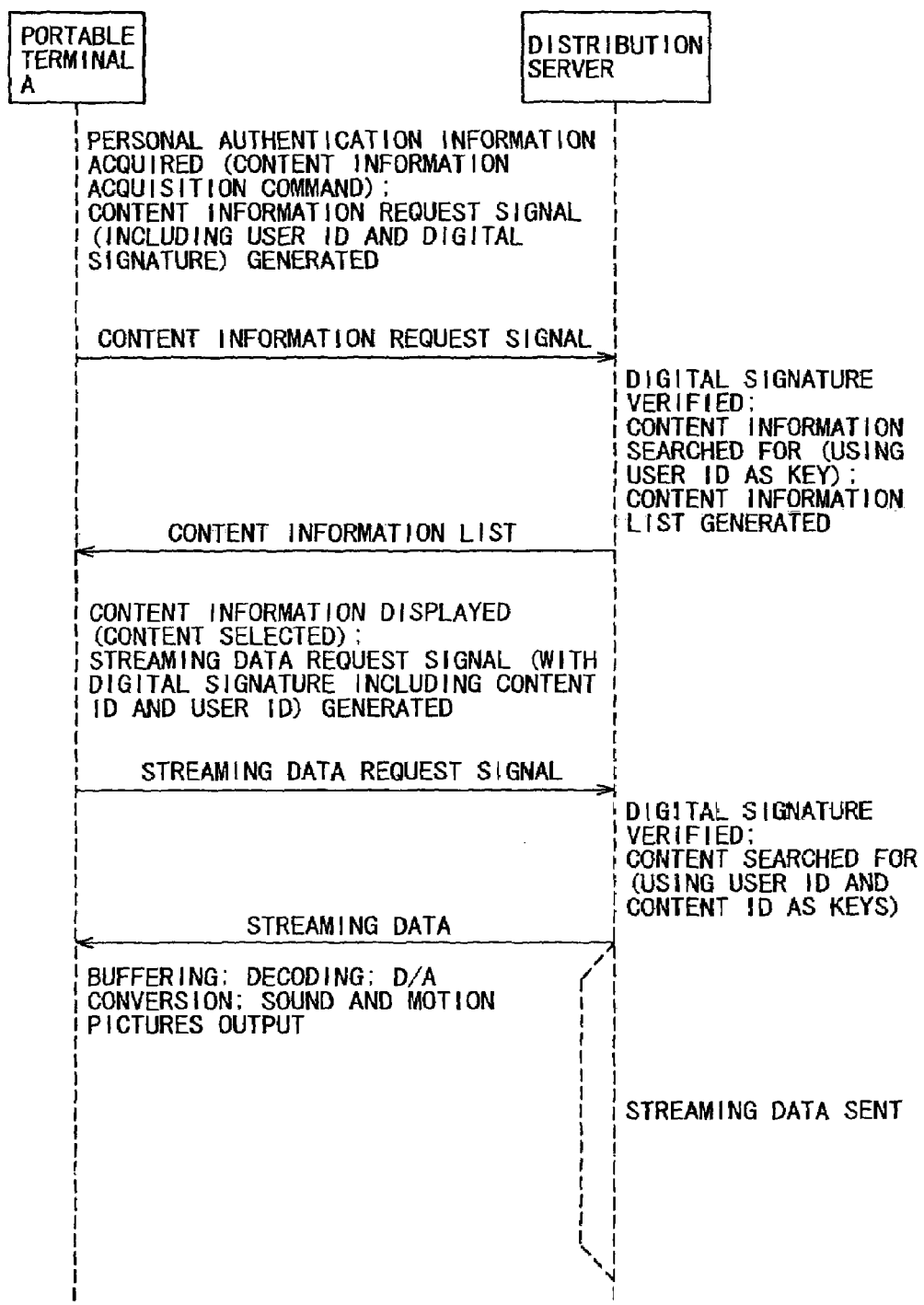
FIG. 5 is a schematic flow diagram showing how the portable terminal of FIG. 2 works, the diagram indicating more detailed steps performed by a user to receive a usable content from a distribution server 60 and to reproduce the received content on the portable terminal.

Described below with reference to FIG. 5 are the steps to be performed by the user operating his or her personal terminal to receive a usable (i.e., purchased) content from the distribution server 60 and to reproduce the received content.

The user operates the operation panel 107 on the portable terminal A. In so doing, the user can select a content information acquisition command from a menu displayed on the display unit 105.

In response to the menu selection operation, the digital signature generation unit 120 generates a digital signature including the user ID held in the user ID storage unit 118. The content information management unit 114 generates a content information request signal to which the digital signature thus generated is attached, and sends the digital signature to the distribution server 60 through the network connection unit 108.

The distribution server 60 authenticates the digital signature attached to the content information request signal and, using the user ID in the content information request signal as a search key, searches the content database (not shown) of the content server 40 for the contents that are usable by the user of the portable terminal A. The distribution server 60 prepares a content information list enumerating the contents usable by the user in question, and returns the content information list to the portable terminal A over the network.

Upon receipt of the content information list on the portable terminal A through the network connection unit 108, the content information management unit 114 stores the received content information list into the content information storage unit 115. At the same time, the display control unit 104 commands the display unit 105 to display the received content information list.

The user views the content information list on the display unit 105 may select a desired content from among those listed content information by operating the operation panel 107.

In response to the selecting operation conducted by the user, the digital signature generation unit 120 generates a digital signature including a content ID (held in the content information storage unit 115) of the selected content and the user ID (stored in the user ID storage unit 118). The streaming data request signal generation unit 125 generates a streaming data request signal to which the digital signature thus generated is attached, and sends the request signal to the distribution server 60 through the network connection unit 108.

Upon receiving the streaming data request signal, the distribution server 60 authenticates the digital signature attached to the request signal, and start searching the content database (not shown) of the content server 40 for the content requested from the portable terminal A by using the content ID and user ID in the request signal as search keys. The distribution server 60 then distributes streaming data of the requested content to the requesting portable terminal A.

On the portable terminal A, the streaming data reception control unit 109 receives the streaming data through the network connection unit 108. The streaming data thus received are buffered by the buffering unit 110 at least for a predetermined number of bytes before being forwarded to the decoding unit 111. After decoded by the decoding unit 111, the streaming data are converted to an analog signal by the D/A conversion unit 112. The analog signal is then sent to the audio output unit 113 and/or the display unit 105 for external output (real-time reproduction).

Figure 6:
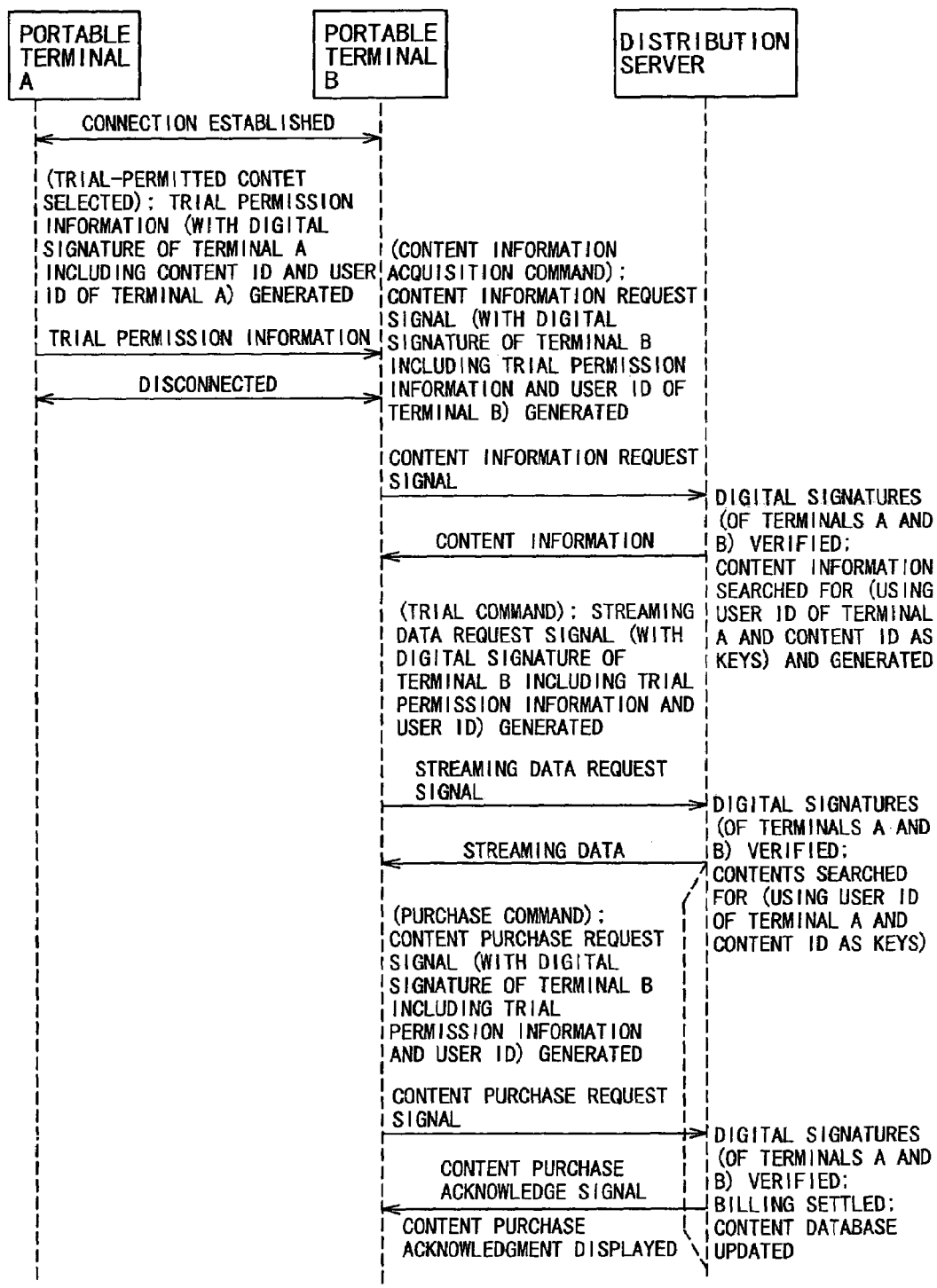
FIG. 6 is another schematic flow diagram depicting how the portable terminal of FIG. 2 works, the diagram illustrating more detailed steps performed by a first user to permit a second user to try out a given content usable by the first user.

Described below with reference to FIG. 6 are the steps performed on the portable terminal A to permit the portable terminal B to try out certain content usable on the portable terminal A. It is assumed that the portable terminals A and B each consist of the structure as same as that in FIG. 2.

The user of the portable terminal A initially establishes a terminal-to-terminal connection with the portable terminal B through the inter-terminal connection unit 119, the terminal B being owned by the user for whom the for-trial content is intended.

The user of the portable terminal A then selects the content in question from a content information list displayed on the display unit 105, and enters a trial permission command. In response to the input command, the digital signature generation unit 120 generates a digital signature including a content ID (held in the content information storage unit 115) of the selected content and the user ID (stored in the user ID storage unit 118). The trial permission information sending control unit 122 prepares trial permission information to which the digital signature thus generated is attached, and sends the information to the portable terminal B through the inter-terminal connection unit 119.

Upon receipt of the trial permission information from the portable terminal A, the portable terminal B can proceed with reproducing the applicable content.

More specifically, the trial permission information reception control unit 123 in the portable terminal B receives the trial permission information from the portable terminal A through the inter-terminal connection unit 119. The received trial permission information is held temporarily in the trial permission information storage unit 124.

Through a menu displayed on the display unit 105, the user may operate the operation panel 107 to select a content information acquisition command for acquiring the trial-permitted content.

In response to the selecting operation conducted by the user, the digital signature generation unit 120 permission information held in the trial permission information storage unit 124 and the user ID stored in the user ID storage unit 118. The content information management unit 114 generates a content information request signal to which the digital signature thus generated is attached, and sends the request signal to the distribution server 60 through the network connection unit 108.

On receiving the content information request signal containing the trial permission information from the portable terminal B, the distribution server 60 authenticates the digital signature attached to the request signal as well as the digital signature in the trial permission information included in the request signal. After the authentication, the distribution server 60 searches the content database (not shown) of the content server 40 for the information about the content permitted for trial and returns the retrieved information in question to the requesting portable terminal B over the network.

On the portable terminal B, the content information management unit 114 receives the retrieved content information for trial through the network connection unit content information storage unit 115. This content information for trial placed into the content information storage unit 115 includes a flag indicating that the content in question is intended for trial.

The display control unit 104 then causes the display unit 105 to display information of the trial-permitted content. Through a menu displayed on the display unit 105, the user may operate the operation panel 107 to select a trial command.

In response to the selecting operation conducted by the user, the digital signature generation unit 120 generates a digital signature including both the trial permission information held in the trial permission information storage unit 124 and the user ID stored in the user ID storage unit 118. The streaming data request signal generation unit 125 generates a streaming data request signal containing the digital signature thus generated and sends the request signal to the distribution server 60 through the network connection unit 108.

Upon receipt of the streaming data request signal from the portable terminal B, the distribution server 60 authenticates the digital signature included in the received request signal as well as the digital signature contained in the trial permission information in the request signal. After the authentication, the distribution server 60 searches the content database (not shown) of the content server 40 for the content requested by the portable terminal B, using the user ID and content ID in the trial permission information as search keys. The distribution server 60 then sends streaming data constituting the requested content to the requesting portable terminal B. Upon receipt of the streaming data of the content for trial, the portable terminal B reproduces the content in the same manner as usual contents.

It should be noted that the streaming data distribution is not conducted by the same trial permission information more than one time, i.e., one trial permission allows the applicable content to be tried out only once.

After trying out the content recommended by the user of the portable terminal A, the user of the portable terminal B may decide to purchase the content. The steps involved for the purchase are as follows:

Through a menu displayed on the display unit 105, the user of the portable terminal B may operate the operation panel to select a command to purchase the tried-out content.

In response to the selecting operation conducted by the user, the digital signature generation unit generates a digital signature including both the trial permission information held in the trial permission information storage unit 124 and the user ID stored in the user ID storage unit 118. The content purchase request signal generation unit 126 generates a content purchase request signal to which the digital signature thus generated is attached, and sends the request signal to the distribution server 60 through the network connection unit 108.

Upon receipt of the content purchase request signal, the distribution server 60 authenticates the digital signature. Then based on the user ID in the content purchase request signal and on the content ID in the trial permission signal, the distribution server 60 adds a record of the user in question to the content server 40 as a user authenticated to use the content of interest.

The distribution server 60 proceeds to acquire relevant content information (billing information, etc.) from the content database (not shown) of the content server 40, and sends transaction information containing the user ID and the content information to the electronic settlement server 70.

In keeping with the received transaction information, the electronic settlement server 70 handles billing including updates of an accounting settlement database, not shown. The electronic settlement server 70 is furnished with the accounting settlement database that stores electronic settlement transactions regarding content purchases, and settles the billings of individual client terminals by means of illustratively electronic money. Alternatively, the electronic settlement server 70 may have respective numbers of credit card, cash card, and/or debit card registered as part of information about the users of individual client terminals. The settlement server 70 may then cooperate with other financial institutions (not shown) in dealing with credit or debit card settlements.

After the billing process is completed by the electronic settlement server 70, the distribution server 60 returns a content purchase acknowledge signal to the requesting portable terminal B. On the portable terminal B, a content purchase confirmation may be displayed on the display unit 105.

With the content purchase process completed, the content in question is allowed to be used on the portable terminal B. Specifically, the user of the portable terminal B may request the applicable streaming data to the distribution server 60 for real-time content reproduction by following the steps described above with reference to FIG. 5.

SECOND EMBODIMENT

Figure 3:
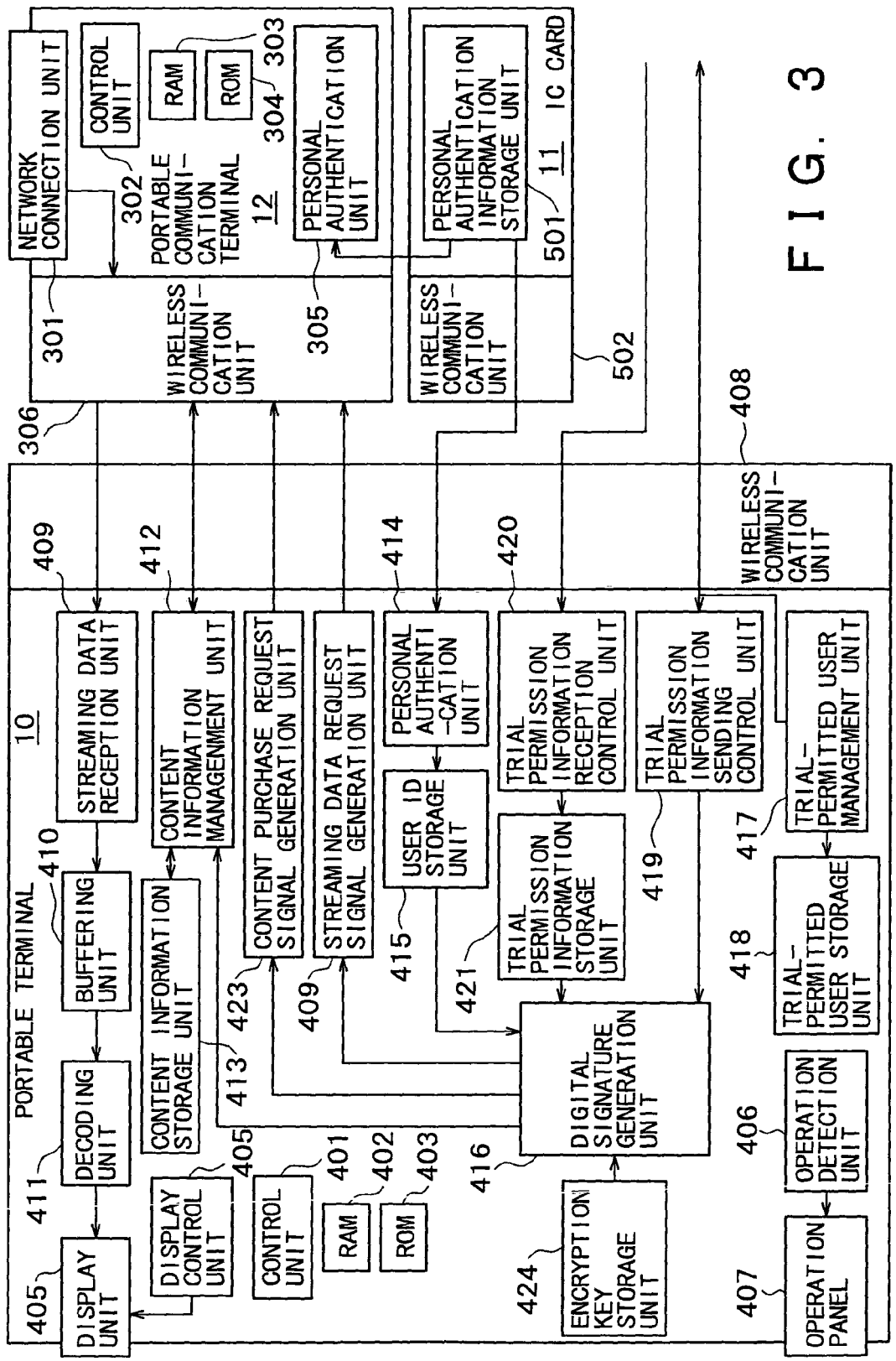
FIG. 3 is a block diagram illustrating another typical structure of the portable terminal 10 acting as a content receiving client of the streaming distribution system 1 according to the present invention.

FIG. 3 illustrates another typical structure of the portable terminal 10 acting as a content receiving client of the streaming distribution system 1 according to the present invention. The portable terminal 10 shown in FIG. 3 is including a frame of portable terminal 10 that acts primarily to reproduce streaming data, by an IC card 11 for retaining authentication information, and a portable communication terminal 12 for communicating with the distribution server over the network. The components 10, 11 and 12 are interconnected wirelessly by wireless communication units 306, 408 and 502.

The portable communication terminal 12 comprises a telephone feature, not shown. A network connection unit 301 is connected to a network such as the Internet 20 for communication with the distribution server 60 over the network. Under overall control of a control unit 302, the portable communication terminal 12 mediates data exchanges between the wireless communication unit 306 and the network connection unit 301. The control unit 302 has a RAM 303 that may be used as a work area and a ROM 304 that permanently stores program codes and other data. A personal authentication unit 305 carries out a predetermined authentication process based on personal authentication information retrieved from the IC card 11 via the wireless communication unit 306.

The entire performance of portable terminal 10 is controlled by a control unit 401. The control unit 401 includes a RAM (random access memory) 402 and a ROM (read only memory) 403. The RAM 402 may serve as an area in which to retain loaded programs and work data. The ROM 403 permanently stores program codes and other specific data. The control unit 401 is connected to various functional units shown in the figure, in order to control these units.

A display control unit 404 is connected to a display unit 405. The control unit 404 controls driving of displays on the display unit 405.

An operation detection unit 406 is connected to an operation panel 407. As such, the detection unit 406 detects input operations performed by the user on the Operation panel 407. The user interface of the portable terminal 10 consists of display unit 405 and operation panel 407 constitute.

A streaming data reception unit 409 receives streaming data from the distribution server 60 through the portable communication terminal 12. A buffering unit 410 temporarily buffers the streaming data being received. A decoding unit 411 decodes the encoded streaming data. The decoded data are displayed as motion pictures on the display unit 405 under display drive control of the display control unit 404.

A content information management unit 412 sends a content information request signal to the distribution server 60 through the portable communication terminal 12. The management unit 412 then receives content information via the portable communication terminal 12 and stores the received information into a content information storage unit 413.

The content information storage unit 413 holds at least one record with fields including a content ID, a content name, explanation of the content, and a flag indicating whether the content has been purchased or is intended for trial.

A wireless communication unit 408 performs non-contact data communication with the portable communication terminal 12 and IC card 11. In addition, the wireless communication unit 408 can establish a terminal-to-terminal connection with another portable terminal by means of such short-distance wireless communication means as IEEE802.11, Bluetooth, or infrared communication (IrDA) arrangements.

A personal authentication unit 414 receives through the wireless communication unit 408 personal authentication information held in a personal authentication information storage unit 501 of the IC card 11, and authenticates the received information. After the authentication, the personal authentication unit 414 stores into a user ID storage unit 415 the user ID included in the personal authentication information.

A digital signature generation unit 416 generates a digital signature to be attached to data, by means of an encryption key stored in an encryption key storage unit 424.

A trial-permitted user management unit 417 manages user information (e.g., users IDs and/or names) about the users permitted to try out contents, the information being stored in a trial-permitted user storage unit 418.

A trial permission information sending control unit 419 sends trial permission information for permitting content trial to another portable terminal through the wireless communication unit 408. The trial permission information contains a user ID stored in the user ID storage unit 415. A digital signature generated by the digital signature generation unit 416 is attached to the trial permission information.

A trial permission information reception control unit 420 receives through the wireless communication unit 408 trial permission information sent from another user's portable terminal.

A streaming data request signal generation unit 422 generates a signal for requesting streaming data including the content desired to be reproduced on this portable terminal 10, and sends the generated signal to the distribution server 60 through the portable communication terminal 11. The streaming data request signal includes both the content ID held in the content information storage unit 413 and the user ID stored in the user ID storage unit 415. A digital signature generated by the digital signature generation unit 416 is attached to the streaming data request signal.

A content purchase request signal generation unit 423 generates a request for the purchase of content to be tried out, and sends the generated request in signal form to the distribution server 60 through the wireless communication unit 408 and portable communication terminal 12. The content purchase request signal includes the user ID and the trial permission information received from another portable terminal.

The performance of portable terminal shown in FIG. 3 will now be described. Personal authentication by use of the IC card 11 is carried out as follows: the IC card 11, portable terminal 10, and portable communication terminal 12 are first positioned respectively within the area small enough for wireless communications to take place among them. When a connection is established among the IC card 11, portable terminal 10, and portable communication terminal 12, the personal authentication information held in the personal authentication information storage unit 501 of the IC card 11 is sent to the personal authentication unit 414 of the portable terminal 10 as well as to the personal authentication unit 305 of the portable communication terminal 12 through the wireless communication units 502, 306 and 408. After authenticating the received personal authentication information, the personal authentication unit 414 stores into the user ID storage unit 415 the user ID contained in the personal authentication information. When the connection between the portable terminal 10 and the IC card 11 is disconnected, the personal authentication unit 414 deletes the user ID from the user ID storage unit 415.

Subsequently, the following is steps of procedure performed by the user operating his or her personal terminal 10 to receive a usable (i.e., purchased) content from the distribution server 60 and to reproduce the received content. The steps involved are similar to those outlined in the schematic flow diagram of FIG. 5.

The user operates the operation panel 407 on the portable terminal A. By doing so, the user can select a content information acquisition command from a menu displayed on the display unit 405.

In response to the menu selection operation, the digital signature generation unit 416 generates a digital signature including the user ID held in the user ID storage unit 415. The content information management unit 412 generates a content information request signal to which the digital signature thus generated is attached, and sends the digital signature to the distribution server 60 through the portable communication terminal 11.

The distribution server 60 authenticates the digital signature attached to the content information request signal and, using the user ID in the content information request signal as a search key, searches the content database of the content server 40 for the contents that are usable by the user of the portable terminal. The distribution server 60 prepares a content information list enumerating the contents usable for the user in question, and returns the content information list to the portable terminal 10 through the portable communication terminal 12.

Upon receipt of the content information list on the portable terminal 10 through the wireless communication unit 408, the content information management unit 412 stores the received list into the content information storage unit 413. At the same time, the display control unit 404 commands the display unit 405 to display the received content information list.

The user views the content information list on the display unit 405. By operating the operation panel 407, the user may select a desired content from those listed in the displayed content information list on the display unit 405.

In response to the selecting operation conducted by the user, the digital signature generation unit 416 generates a digital signature including a content ID (held in the content information storage unit 413) of the selected content and the user ID (stored in the user ID storage unit 415). The streaming data request signal generation unit 422 generates a streaming data request signal to which the digital signature thus generated is attached, and sends the request signal to the distribution server 60 through the portable communication terminal 12.

On receiving the streaming data request signal, the distribution server 60 authenticates the digital signature attached to the request signal before searching the content database (not shown) of the content server 40 for the requested content, using the content ID and user ID in the request signal as search keys. The distribution server 60 then distributes streaming data of the requested content to the requesting portable terminal 10.

On the portable terminal 10, the streaming data reception unit 409 receives the streaming data through the portable communication terminal 12 and wireless communication unit 408. The streaming data thus received are buffered by the buffering unit 410 at least for a predetermined number of bytes before being forwarded to the decoding unit 411. After decoded by the decoding unit 411, the streaming data are sent to the display unit 405 for motion picture display output (real-time reproduction).

Figure 7:
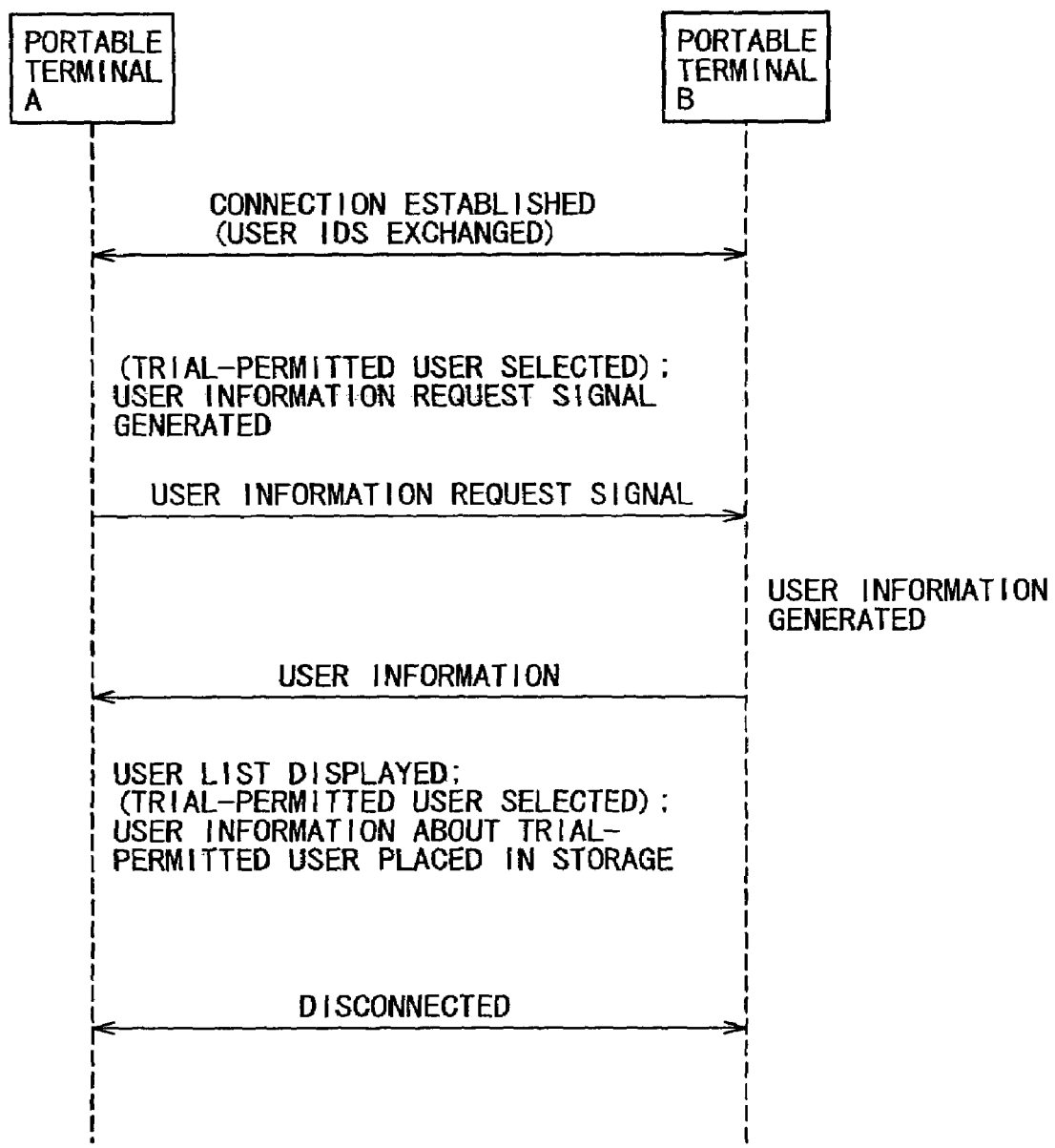
FIG. 7 is another schematic flow diagram outlining how the portable terminals of FIG. 3 work, the diagram showing more detailed steps performed by the first user to designate the second user who is asked to try out a given content usable by the first user.

Described below with reference to FIG. 7 are the steps performed by the user of a portable terminal A to designate a user of a portable terminal B permitted to try out a certain content usable on the portable terminal A. In this case, it is assumed that the portable terminals A and B each have the same structure as that in FIG. 3.

By operating the operation panel 107, the user of the portable terminal A first selects a trial-permitted user change command from a menu displayed on the display unit 407.

In response to the selecting operation conducted by the user, the trial-permitted user management unit 417 sends a user information request through the wireless communication unit 408. When user information is received in turn from the portable terminal B through the wireless communication unit 408, the display control unit 404 causes the display unit 405 to display a list of communicable users. A connection between the portable terminals is established after they have exchanged their user ID's.

The user of the portable terminal A may select a user permitted for content trial by operating the operation panel 407 through the display unit 405 showing the communicable user list.

In response to the selecting operation conducted by the user, the trial-permitted user management unit 417 stores information about the user in question into the trial-permitted user storage unit 418. When the trial permission information sending control unit 419 acquires the user ID of a given communicable portable terminal, the trial-permitted user management unit 417 checks to see if that user ID is already stored in the trial-permitted user storage unit 418. If the user ID is found to be held in the storage unit 418, the trial-permitted user management unit 417 sends trial permission information to the applicable portable terminal.

After the trial permission information is sent to the portable terminal whose user is asked to try out the content, the terminal-to-terminal connection is disconnected, and the processing as a whole is brought to an end.

Figure 8:
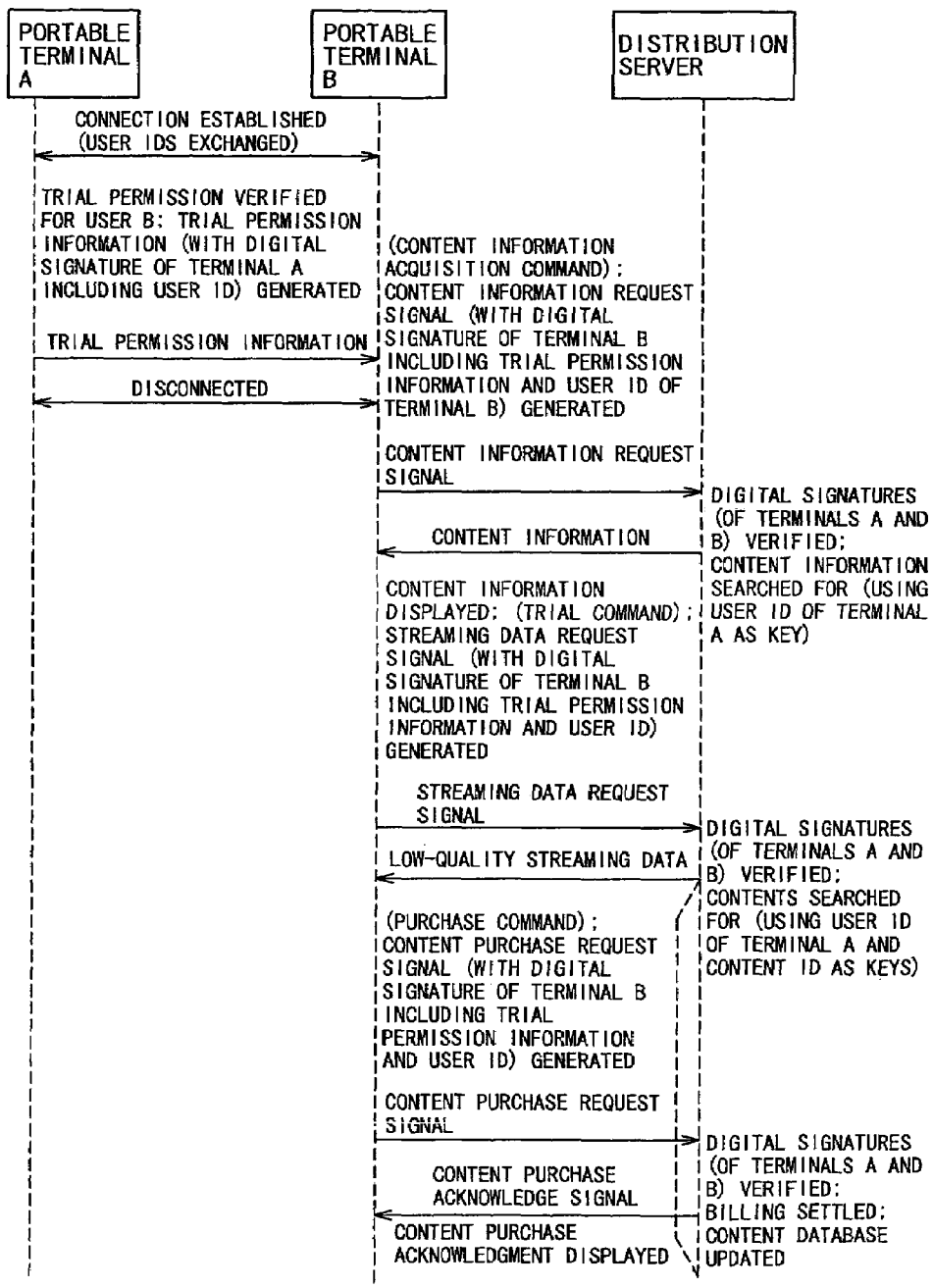
FIG. 8 is another schematic flow diagram indicating how the portable terminals of FIG. 3 work, the diagram depicting more detailed steps performed by the user of a portable terminal A to permit the user of a portable terminal B to try out a given content usable on the terminal A, as well as steps carried out by the user of the portable terminal B to request the trial of the content from the distribution server 60 upon receipt of trial permission information from the portable terminal A, before the content thus tried out is purchased by the user of the terminal B from the server.

Described below with reference to FIG. 8 is the steps performed by the user of a portable terminal A to permit the user of a portable terminal B to try out a given content usable on the terminal A, as well as the steps carried out by the user of the portable terminal B to request the trial of the content from the distribution server 60 upon receipt of trial permission information from the portable terminal A, as well as steps to purchase the content thus tried out by the user of the terminal B from the distribution server. It is assumed that the portable terminals A and B each have the same structure as that in FIG. 3.

A connection is first established between the portable terminals A and B following execution of predetermined steps such as exchanges of user IDs. Upon receipt of trial permission information from the portable terminal A through the wireless communication unit 408, the trial permission information reception control unit 420 of the portable terminal B stores the received information temporarily into the trial permission information storage unit 421.

Through a menu displayed on the display unit 405, the user of the portable terminal B may operate the operation panel 407 to select a content information acquisition command for acquiring the content permitted for trial.

In response to the selecting operation conducted by the user, the digital signature generation unit 416 in the portable terminal B generates a digital signature including both the trial permission information held in the trial permission information storage unit 421 and the user ID stored in the user ID storage unit 415. The content information management unit 412 generates a content information request signal to which the digital signature thus generated is attached, and sends the request signal to the distribution server 60 through the portable communication terminal 12.

Upon receiving the content information request signal containing the trial permission information from the portable terminal B, the distribution server 60 authenticates the digital signature attached to the content information request signal as well as the digital signature in the trial permission information included in the content information request signal. After the authentication, the distribution server 60 searches the content database (not shown) of the content server 40 for the content information about the contents that are available for the user who has sent the trial permission information. The retrieved content information is returned to the portable terminal B through the portable communication terminal 12.

Upon receipt of the content information about the content to be tried out through the portable communication terminal 12, the content information management unit 412 in the portable terminal B stores the received information into the content information storage unit 413. If the trial-permitted content has not been purchased yet by the user of the portable terminal B, a record of the content information in question includes a flag indicating that the content is intended for trial.

The display control unit 404 then causes the display unit 405 to display the content information about the content of interest. Through a menu shown on the display unit 405, the user may operate the operation panel 407 to select a trial command.

In response to the selecting operation conducted by the user, the digital signature generation unit 416 generates a digital signature based on both the trial permission information held in the trial permission information storage unit 421 and the user ID stored in the user ID storage unit 415. The streaming data request signal generation unit 423 generates a streaming data request signal including the digital signature thus generated, and sends the request signal to the distribution server 60 through the portable communication terminal 12.

Upon receipt of the streaming data request signal from the portable terminal B, the distribution server 60 authenticates the digital signature in the streaming data request signal as well as the digital signature included in the trial permission information in the request signal. After these authentications, the distribution server 60 searches the content database (not shown) of the content server 40 for the requested content, using the user ID and content ID in the trial permission information as search keys.

The distribution server 60 then sends low-quality streaming data of the content in question to the requesting portable terminal B.

On receiving the low-quality streaming data of the for-trial content, the portable terminal B reproduces the content in the same manner as usual contents.

The user of the portable terminal B may select a command for the purchase of the for-trial content by operating the operation panel 407 through a menu displayed on the display unit 405.

In response to the selecting operation conducted by the user, the digital signature generation unit 416 generates a digital signature including the content ID of the content to be tried out and the user ID stored in the user ID storage unit 415. The content purchase request signal generation unit 423 generates a content purchase request signal to which the digital signature thus generated is attached, and sends the request signal to the distribution server 60 through the portable communication terminal 12.

Upon receipt of the content purchase request signal from the portable terminal B, the distribution server 60 authenticates the attached digital signature. Then based on the user ID and content ID in the content purchase request signal, the distribution server 60 adds a record of the user in question to the content server 40 as a user allowed to use the content of interest.

The distribution server 60 proceeds to acquire relevant content information (billing information, etc.) from the content database (not shown) of the content server 40, and sends transaction information containing the user ID and the content information to the electronic settlement server 70.

In keeping with the received transaction information, the electronic settlement server 70 handles billing including updates of an accounting settlement database. The electronic settlement server 70 is furnished with the accounting settlement database that stores electronic settlement transactions regarding content purchases, and for example, settles the billings of individual client terminals by means of the electronic money. Alternatively, the electronic settlement server 70 may have respective numbers of credit card, cash card, and/or debit card registered as part of user information about the users of individual client terminals, and may also cooperate with other financial institutions in dealing with credit or debit card settlements.

After the billing process is completed by the electronic settlement server 70, the distribution server 60 returns a content purchase acknowledge signal to the requesting portable terminal B. On the portable terminal B, a content purchase acknowledgment may be displayed on the display unit 405.

Once the content purchase process completed, the content in question will be also available on the portable terminal B. Specifically, the user of the portable terminal B may request the applicable streaming data from the distribution server 60 for real-time content reproduction by following the steps similar to those described above with reference to FIG. 5.

THIRD EMBODIMENT

Figure 4:
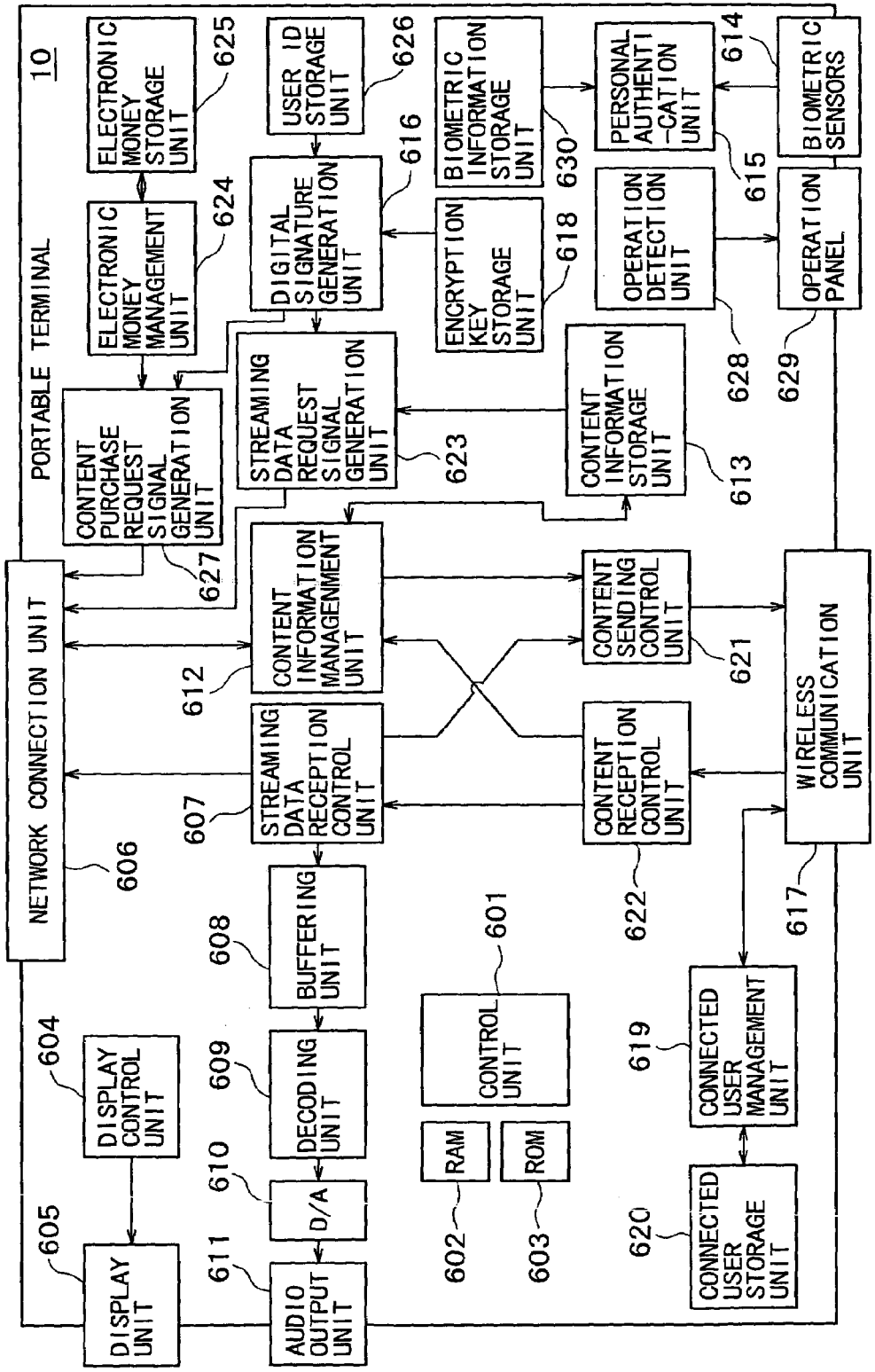
FIG. 4 is a block diagram giving another typical structure of the portable terminal 10 acting as a content receiving client of the streaming distribution system 1 according to the present invention.

FIG. 4 depicts another typical structure of the portable terminal 10 acting as a content receiving client of the streaming distribution system 1 according to the present invention. The portable terminal 10 in FIG. 4 is not equipped with an ID card retaining authentication information. Instead, the portable terminal 10 is designed to use biometric information as personal authentication information, the biometric information being acquired by biometric sensors, to be described later.

The entire performance of the portable terminal 10 is controlled by a control unit 601. The control unit 601 includes a RAM (random access memory) 602 and a ROM (read only memory) 603. The RAM 602 may serve as an area in which to retain loaded programs and work data. The ROM 603 permanently stores program codes and other data. The control unit 601 is connected to various functional units shown in the figure, in order to control these units.

A display control unit 604 is connected to a display unit 605. The control unit 604 controls driving of displays on the display unit 605.

An operation detection unit 628 is connected to an operation panel 629. As such, the detection unit 628 detects input operations performed by the user on the operation panel 629. The display unit 605 and operation panel 629 configure the user interface of the portable terminal 10.

A network connection unit 606 is connected with a network such as the Internet 20, and communicates with the distribution server 60 over the network.

A streaming data reception unit 607 receives streaming data from the distribution server 60 through the network connection unit 606. A buffering unit 608 temporarily buffers the streaming data being received. A decoding unit 609 decodes the encoded streaming data. The decoded data are converted to an analog signal by a D/A conversion unit 610 before being sent to an audio output unit 611 for audio output (real-time reproduction).

A content information management unit 612 sends a content information request signal to the distribution server 60 through the network connection unit 606. The management unit 612 receives content information via the network connection unit 606 and stores the received information into a content information storage unit 613. The content information storage unit 613 holds at least one record with fields including a content ID, a content name, explanation of the content, and etc.

The biometric sensors 614 read biometric information about the user of the portable terminal 10. The biometric information refers to physical information uniquely identifying each user, such as the fingerprint, iris pattern, iris code, venous pattern, voice print, facial pattern, handwriting, etc., read from or yielded by the user's body.

A personal authentication unit 615 verifies the biometric information read by biometric sensors 614 with previously stored biometric information in a biometric information storage unit 630. If those two sets of information are judged to be derived from the same person, a digital signature generation unit 616 (to be described later) is ordered to cancel its functional restrictions.

A wireless communication unit 617 can establish a terminal-to-terminal connection with another user's portable terminal using such short-distance wireless communication means as IEEE802.11, Bluetooth, or infrared communication (IrDA) arrangements.

The digital signature generation unit 616 generates a digital signature to be attached to data, by means of an encryption key held in an encryption key storage unit 618 only when the identity of the user is authenticated successfully by the personal authentication unit 615.

A connected user management unit 619 stores into a user storage unit 620 information about the users of portable terminals that are communicable through the wireless communication unit 617. The management unit 619 updates the user information in the user ID storage unit 620 as needed.

A content sending control unit 621 sends through the wireless communication unit 617 streaming data and content information about the content being reproduced on another portable terminal.

A content reception control unit 622 receives streaming data and content information about the content sent from another portable terminal through the wireless communication unit 617.

A streaming data request signal generation unit 523 generates a streaming data request signal for requesting the content desired to be reproduced on the portable terminal 10, and sends the request signal to the distribution server 60 through the network connection unit 606. The streaming data request signal includes both a content ID held in the content information storage unit 613 and a user ID stored in a user ID storage unit 626, and a digital signature generated by the digital signature generation unit 616 is attached to the request signal.

An electronic money management unit 624 manages the electronic money retained in an electronic money storage unit 625.

A content purchase request signal generation unit 627 generates a signal for requesting the purchase of the content for trial, and sends the request signal together with electronic money to the distribution server 60 through the network connection unit 606. The content purchase request signal includes the user ID stored in the user ID storage unit 626, as well as the content ID included in the content information received from another portable terminal 10.

The function of portable terminal 10 shown in FIG. 4 will now be described. Personal authentication based on biometrics is carried out as follows: when the biometric sensors 614 detect biometric information on the user, the personal authentication unit 615 verifies the detected biometric information (fingerprint, iris pattern, iris code, venous pattern, voice print, facial pattern, handwriting, etc.) with the biometric information stored beforehand in the biometric information storage unit 630. If those two sets of information are judged to be derived from the same person, the digital signature generation unit 616 is ordered to cancel its functional restrictions.

Described below are the steps performed by the user receiving a content that is usable (i.e., purchased) on his or her portable terminal and reproducing the received content. The processes for receiving and reproducing contents are similar to the steps in the schematic flow diagram of FIG. 5.

By operating the operation panel 629, the user first selects a content information acquisition command from a menu displayed on the display unit 605.

In response to the selecting operation conducted by the user, the content information management unit 612 generates a content information request signal including the user ID stored in the user ID storage unit 626. The request signal, to which a digital signature generated by the digital signature generation unit 616 is also attached, is sent to the distribution server 60 through the network connection unit 606.

The distribution server 60 authenticates the digital signature attached to the content information request signal. After the authentication, the distribution server 60 searches the content database (not shown) of the content server 40 for the contents that are usable by the user of the portable terminal 10, using the user ID in the content information request signal as a search key. A content information list enumerating the contents judged usable is returned to the portable terminal 10 over the network.

Upon receipt of the content information list through the network connection unit 606, the content information management unit 612 in the portable terminal 10 stores the received content information into the content information storage unit 613. At the same time, the display control unit 604 commands the display unit 605 to display the content information list. The user may select a desired content from the content list on the display unit 605 by operating the operation panel 629.

In response to the selecting operation conducted by the user, the streaming data request signal generation unit 623 generates a streaming data request signal and sends the generated signal to the distribution server 60 through the network connection unit 606. The streaming data request signal includes a content ID (held in the content information storage unit 613) of the content in question and the user ID (stored in the user ID storage unit 625). A digital signature generated in the digital signature generation unit 616 is attached to the request signal.

Upon receipt of the streaming data request signal, the distribution server 60 authenticates the digital signature attached to the request signal. After the authentication, the distribution server 60 searches the content database (not shown) of the content server 40 for the applicable content using the content ID and user ID in the streaming data request signal as search keys. The distribution server 60 sends streaming data configuring the content in question to the requesting portable terminal 10.

The streaming data are received via the network connection unit 606 by the streaming data reception unit 607 in the portable terminal 10. The received streaming data are buffered by the buffering unit 608 at least for a predetermined number of bytes before being forwarded to the decoding unit 609. After decoded by the decoding unit 609, the streaming data are converted to an analog signal by the D/A conversion unit 610 for external output (real-time reproduction) from the audio output unit 611.

Described below with reference to FIG. 9 are the steps performed by the user of a portable terminal A to permit the user of a portable terminal B to try out a given content usable on the terminal A, as well as the steps carried out by the user of the portable terminal B to request the trial of the content from the distribution server 60 upon receipt of trial permission information from the portable terminal A as well as steps for purchasing the content thus tried out. It is assumed that the portable terminals A and B each have the same structure as that in FIG. 4.

The user of the portable terminal a sends a user information request signal through the wireless communication unit 617 to the portable terminal B whose user is asked to try out certain content. On receiving the user information request signal, the portable terminal B returns user information to the requesting portable terminal A.

The user of the portable terminal A selects a trial permission command by operating the operation panel 629. Selection of the command causes the display unit 605 to display a list of communicable users managed by the connected user management unit 620. From the user list thus displayed, the user of the portable terminal A may select the user preferred for content trial.

Once an acknowledge command is input, both streaming data and content information about the content being reproduced are sent to the preferred user's portable terminal B. It is assumed here that a connection has been established between the portable terminals A and B.

Upon receipt of the streaming data and content information from the portable terminal A through the wireless communication unit 617, the content reception control unit 622 of the portable terminal B stores the received streaming data and content information temporarily into the content information storage unit 613.

By operating the operation panel 629, the user then selects a content information display command about the content to be tried out. Selecting the display command commands the display control unit 604 to display on the display unit 605 such data as the name and price of the for-trial content based on the content information held in the content information storage unit 613.

When the user operates the operation panel 629 to select a trial command from a menu displayed on the display unit 605, the received streaming data are buffered by the buffering unit 608 at least for a predetermined amount. The buffered data are fed through the decoding unit 609 and D/A conversion unit

610 before being forwarded to the audio output unit 611 for audio output (real-time reproduction).

After trying out the content, the user of the portable terminal B may operate the operation panel 629 to select a command for the purchase of the content in question.

In response to the selection of the purchase command, the display unit 605 displays an acknowledgment screen describing the name, price and other specifics of the content of interest.

In reply to an acknowledge command selected by the user, the content purchase request signal generation unit 627 generates a content purchase request signal, and sends the generated signal together with electronic money to the distribution server 60 through the network connection unit 606, the amount of money being equivalent to the content fee held in the content information storage unit 613. The content purchase request signal includes the content ID retained in the content information storage unit 613 as well as the user ID stored in the user ID storage unit 626. A digital signature generated in the digital signature generation unit 616 is attached to the content purchase request signal bound for the distribution server 60.

On receiving the content purchase request signal and electronic money, the distribution server 60 authenticates the digital signature, checks if the electronic money is valid, and further verifies that the amount of the transferred electronic money matches the content fee stored in the content database (not shown) of the content server 40. Then based on the user ID and content ID in the content purchase request signal, the distribution server 60 adds a record of the user in question to the content server 40 as a user allowed to use the content of interest.

The distribution server 60 proceeds to send transaction data including the user ID and electronic money to the electronic settlement server 70.

In keeping with the received transaction information, the electronic settlement server 70 handles billings including updates of the accounting settlement database. The electronic settlement server 70 is furnished with the accounting settlement database that stores electronic settlement transactions regarding content purchases, and for example, settles the billings of individual client terminals using electronic money. Alternatively, the electronic settlement server 70 may have respective numbers of credit card, cash card, and/or debit card registered as part of user information about the users of individual client terminals. The settlement server 70 may then cooperate with other financial institutions in dealing with credit or debit card settlements.

After the billing process is completed by the electronic settlement server 70, the distribution server 60 returns a content purchase acknowledge signal to the requesting portable terminal B. On the portable terminal B, a content purchase acknowledgment may be displayed on the display unit 405.

When the content purchase process completed, the content in question will be available on the portable terminal B. Specifically, the user of the portable terminal B may request the applicable streaming data from the distribution server 60 for real-time content reproduction by following the steps similar to those described above with reference to FIG. 5.

With the above-described embodiments of the present invention, the content availability is managed per respective user through personal authentication. Alternatively, the distribution server may authenticate individual client terminals so as to let the content availability be managed regarding each terminal.

The distribution of contents by means of streaming technology under the inventive system described above has just shown, however, this is not limitative. Alternatively, content data may be distributed freely in encoded form while an access right management server is set up to distribute access rights describing the specific conditions for access to the distributed contents. Upon request from a given client in that setup, the access right management server distributes access right information bound for the client or for its user. The access right information carries an applicable user ID or client ID together with a digital signature of the management server. The access right management server proceeds to charge the client or its user for the content to be accessed based on the distributed right. The client authenticates the use conditions included in the access right information and, depending on the result of the authentication, decodes and reproduces the encrypted content using an encryption key distributed along with or prior to the access right information distributed. Where access to the contents is managed in this manner, trial permission information may be issued in the same format as the access right information.

Addendum

It is to be understood that while the present invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

INDUSTRIAL APPLICABILITY

As described above, the present invention provides a content distribution system, a content distribution method, and a client terminal whereby contents that can be used on a given user terminal may be recommended to a user of another terminal.

The present invention also provides a content distribution system, a content distribution method, and a client terminal whereby contents that can be used on a given user terminal may be tried out on another user terminal while the copyrights of the contents in question are suitably protected. Accordingly, it is easy for any user to recommend a preferred content to another user on a person-to-person basis without infringing on content copyrights.

The present invention also provides a content distribution system, a content distribution method, and a client terminal whereby the content tried out on recommendation from another user may be purchased on the spot without recourse to the elaborate steps for searching the content in question. The inventive setup gives content providers more opportunities to deliver or distribute their contents in addition to marketing content-carrying media and offering content distribution services at websites. The contents can thus be marketed efficiently by word of mouth between friends and acquaintances, whereby the businesses involved in producing, marketing, distributing and delivering contents can be promoted significantly.

The invention claimed is:

1. A content distribution system, comprising:
a distribution server for giving permission to reproduce contents;
a first client terminal for reproducing distributed contents; and
a second client terminal for reproducing distributed contents;

wherein the second client terminal transmits trial permission information to the first client terminal; and wherein the first client terminal generates a digital signature based on the trial permission information, generates a request comprising the digital signature and the trial permission information, and transmits the request to the distribution server, and wherein the distribution server receives the request, authenticates the digital signature in the request, and transmits content based on the trial permission information to the first client terminal.

2. A content distribution system according to claim 1, wherein the content is encrypted content and wherein the distribution server transmits the encrypted content in response to the request after authenticating the digital signature in the request.

3. A content distribution system according to claim 1, wherein the first client terminal reproduces the content sent from the distribution server.

4. A content distribution system according to claim 1, wherein the first client terminal authenticates a user attempting to use the first client terminal.

5. A content distribution system according to claim 1, wherein the content is subject to predetermined restrictions.

6. A content distribution system according to claim 5, wherein the predetermined restrictions control a predetermined number of times the content can be reproduced.

7. A content distribution system according to claim 1, wherein the digital signature is further based on a user ID stored in the user ID storage unit of the first client terminal.

8. A content distribution method for distributing contents over a network including a distribution server for giving permission to reproduce contents and client terminals for reproducing contents, the content distribution method comprising:
   transmitting trial permission information to a first client terminal from a second client terminal;
   generating a digital signature based on the trial permission information transmitted to the first client terminal;
   generating a request comprising the digital signature and the trial permission information;
   transmitting the request from the first client terminal to the distribution server;
   authenticating the digital signature in the request on the distribution server;
   transmitting content to the first client terminal from the distribution server based on the trial permission information; and reproducing the content on the first client terminal.

9. A content distribution method according to claim 6,
   wherein the content is encrypted content, and
   wherein the authenticating comprises use of an encryption key,
   wherein the distribution server transmits the encrypted content after the authenticating.

10. A content distribution method according to claim 8, further comprising:
    commanding the first client terminal to authenticate a user attempting to use the first client terminal, wherein the user is authenticated before acquiring the trial permission.

11. A content distribution method according to claim 8, wherein the content is subject to predetermined restrictions.

12. A content distribution method according to claim 11, wherein the predetermined restrictions control a number of times the content can be reproduced.

13. A content sharing system for sharing contents over a network, comprising:
    client terminals within one network, wherein a first client terminal can access content information stored by a second client terminal on the network; and
    a server for sending contents to the client terminals;
    wherein the second client terminal transmits a selection of a user preferred for content trial from a list of communicable users to the first client terminal;
    wherein the first client terminal transmits user information to the second client terminal;
    wherein the second client terminal transmits streaming data and contents ID corresponding to the streaming data to the first client terminal after receiving an acknowledge input of the user information; and
    wherein the first client terminal generates a digital signature based on the contents ID and a user ID stored by the first client terminal, generates a request comprising the digital signature and the contents ID, and sends the request to the server, and
    wherein the server receives the request, authenticates the digital signature in the request, and transmits content based on the contents ID to the first client terminal.

14. A content sharing system according to claim 13, wherein the content is stored temporarily by the first client terminal.

15. A content sharing system according to claim 13, wherein the streaming data are buffered by a buffering unit; and
    wherein buffered data are fed through a decoding unit before being forwarded to an audio output unit for audio output.

16. A content sharing system according to claim 13, wherein the server further receives an electronic payment with the request, checks that the electronic payment is valid, and verifies that amount of the electronic payment matches a fee for the content before the transmitting of the content.

17. A content sharing method for sharing contents over a network including client terminals, the content sharing method comprising:
    displaying a list of communicable users managed by a connected user management unit on a display of the second client terminal, wherein a user of the second client terminal selects a user of the first client terminal for content trial from the list;
    transmitting a user information request to a first client terminal from a second client terminal;
    transmitting user information to the second client terminal from the first client terminal;
    transmitting streaming data and contents ID to the first client terminal from the second client terminal;
    generating a digital signature based on the contents ID and a user ID stored by the first client terminal;
    generating a request comprising the digital signature and the contents ID;
    transmitting the request to a server from the first client terminal; and
    transmitting content corresponding to the contents ID from the server to the first client terminal after authenticating the digital signature in the request.

* * * * *

UNITED STATES PATENT AND TRADEMARK OFFICE
CERTIFICATE OF CORRECTION

| | | |
|---|---|---|
| PATENT NO. | : 7,600,262 B2 | Page 1 of 1 |
| APPLICATION NO. | : 10/416429 | |
| DATED | : October 6, 2009 | |
| INVENTOR(S) | : Ryosuke Nomura | |

It is certified that error appears in the above-identified patent and that said Letters Patent is hereby corrected as shown below:

Claim 9, col. 23, line 51, "claim 6" should read -- claim 8 --.

Signed and Sealed this

Fifth Day of January, 2010

David J. Kappos
*Director of the United States Patent and Trademark Office*